No. 815,700. PATENTED MAR. 20, 1906.
R. O. HAMMOND.
COMBINED CIGAR CLIPPER AND MATCH SAFE.
APPLICATION FILED MAR. 20, 1905.

3 SHEETS—SHEET 1.

WITNESSES:
Julius Lanker
Harry Harris

Robert O. Hammond, INVENTOR
BY
Emil Neukart
ATTORNEY

No. 815,700. PATENTED MAR. 20, 1906.
R. O. HAMMOND.
COMBINED CIGAR CLIPPER AND MATCH SAFE.
APPLICATION FILED MAR. 20, 1905.

3 SHEETS—SHEET 2.

WITNESSES:
Julius Lankes
Harry Harris

Robert O. Hammond.
INVENTOR

BY
Emil Neuhart
ATTORNEY

No. 815,700. PATENTED MAR. 20, 1906.
R. O. HAMMOND.
COMBINED CIGAR CLIPPER AND MATCH SAFE.
APPLICATION FILED MAR. 20, 1905.

3 SHEETS—SHEET 3.

WITNESSES:
Julius Lankes
Harry Harris

Robert O. Hammond, INVENTOR

BY
Emil Neuhart
ATTORNEY

UNITED STATES PATENT OFFICE.

ROBERT O. HAMMOND, OF BUFFALO, NEW YORK.

COMBINED CIGAR-CLIPPER AND MATCH-SAFE.

No. 815,700. Specification of Letters Patent. Patented March 20, 1906.

Application filed March 20, 1905. Serial No. 251,063.

*To all whom it may concern:*

Be it known that I, ROBERT O. HAMMOND, a citizen of the United States, residing at Buffalo, in the county of Erie and State of New York, have invented certain new and useful Improvements in a Combined Cigar-Clipper and Match-Safe, of which the following is a specification.

My invention relates to improvements in combined cigar-clippers and match-safes, the objects of my invention being to manipulate the cigar-clipper, deliver one match at a time, and actuate an advertising device attached thereto by the operation of a single lever, to provide means to ignite the match delivered as it is removed from the device, and to simplify the construction of the same so as to improve over similar devices now in use.

To these ends the invention consists in the construction, arrangement, and combination of parts to be hereinafter described, and particularly pointed out in the appended claims.

Figure 1:
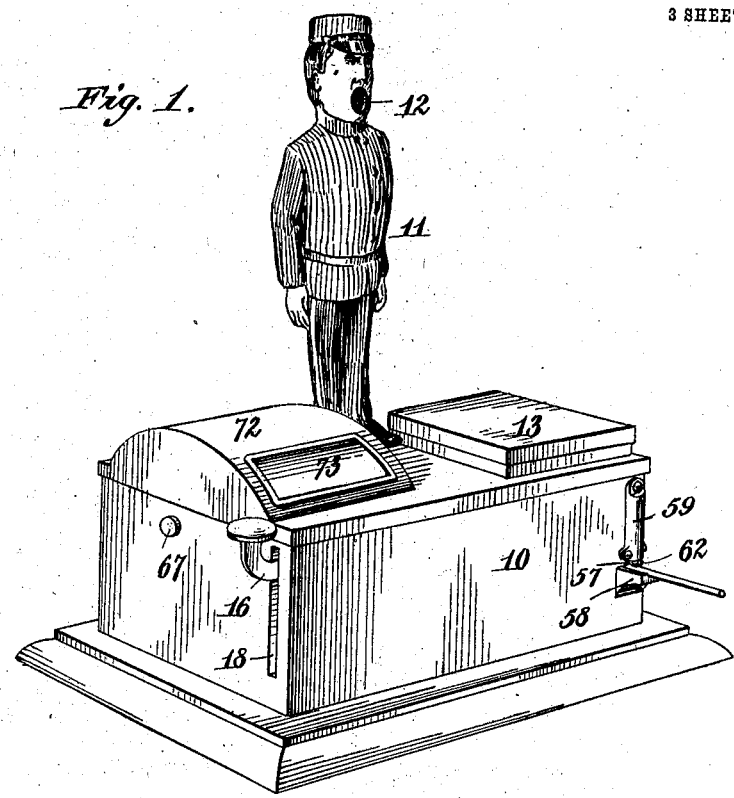
Figure 2:
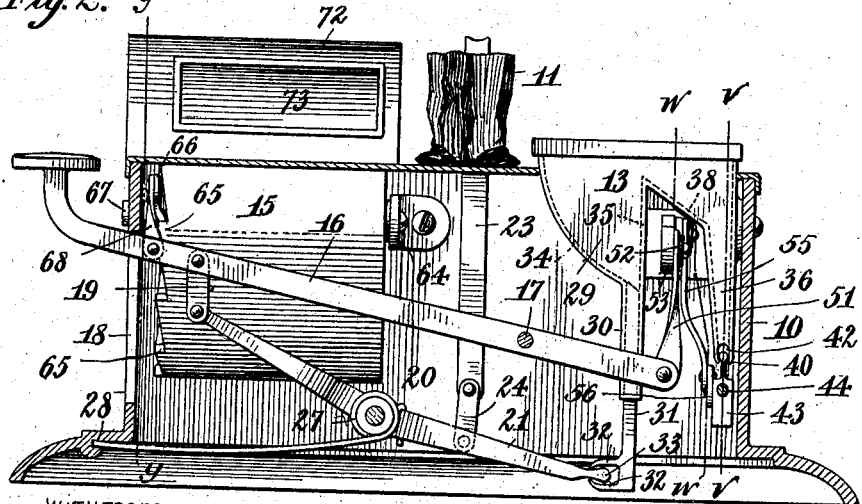
Figure 3:
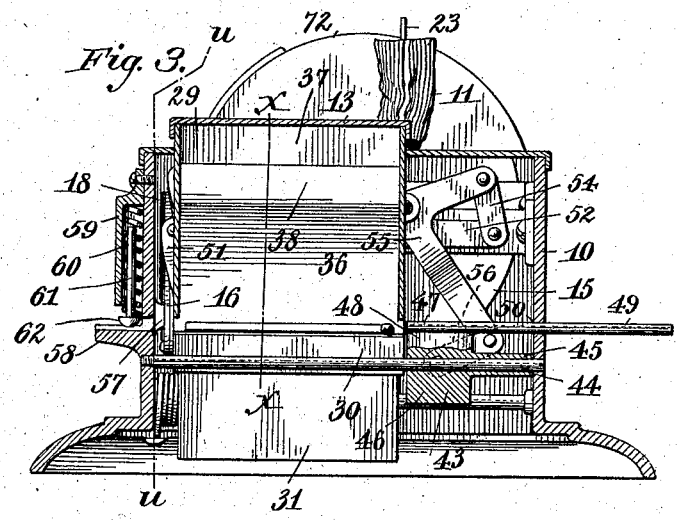
Figure 4:
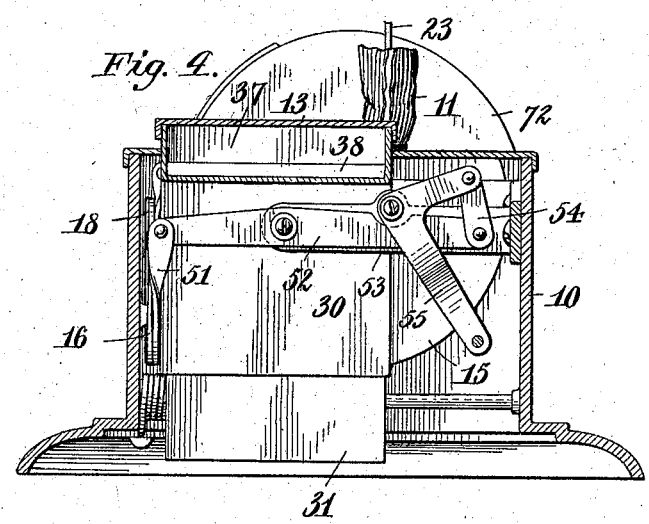
Figure 5:
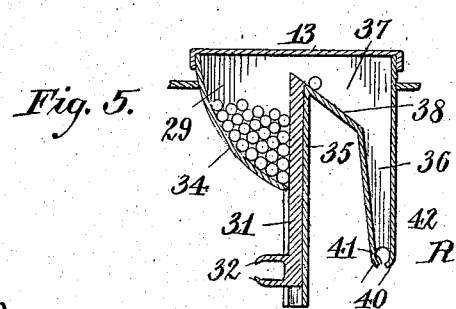
Figure 6:
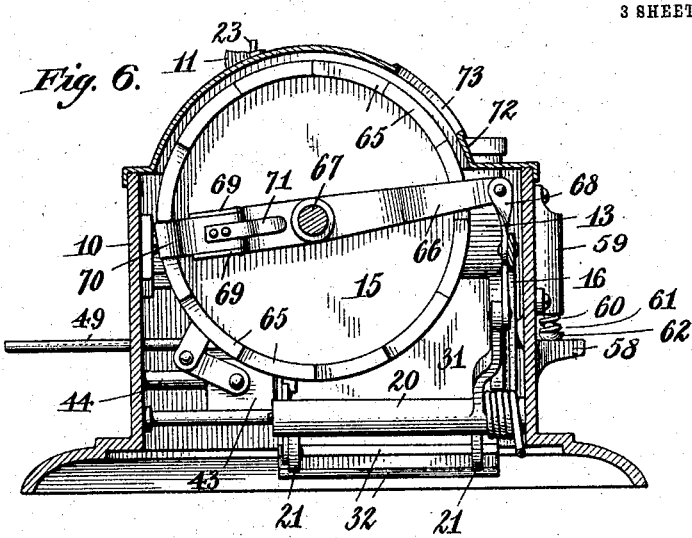
Figure 7:
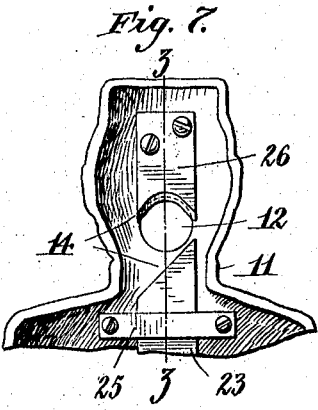
Figure 9:
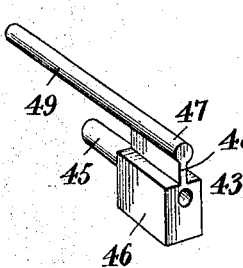
Figure 8:
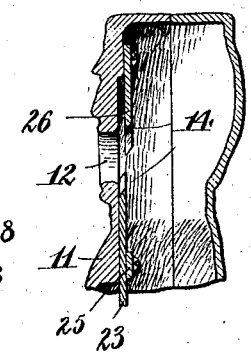
Figure 10:
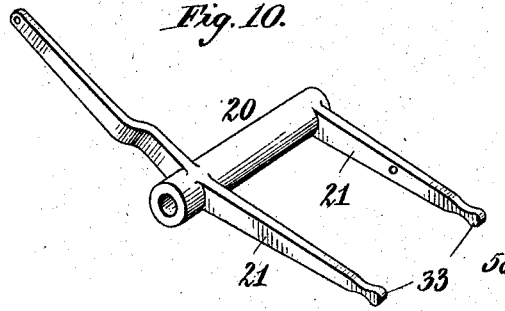
Figure 11:
Figure 12:
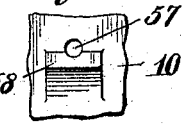

In the accompanying drawings, Figure 1 is a perspective view of the device, showing a match projecting through the delivery-orifice to permit of its being withdrawn from the casing. Fig. 2 is a longitudinal section taken on line *u u*, Fig. 3, looking in the direction of the arrow crossing said line. Fig. 3 is a transverse section taken on line *v v*, Fig. 2, looking toward the left. Fig. 4 is a transverse section taken on line *w w*, Fig. 2. Fig. 5 is a vertical section through the match-safe taken on line *x x*, Fig. 3, the match-lifter being elevated. Fig. 6 is a transverse section taken on line *y y*, Fig. 2, looking toward the right. Fig. 7 is a view showing one-half of the upper part of the casing in which the cigar-clipper is housed. Fig. 8 is a vertical section through the cigar-clipper and its housing, taken on line *z z*, Fig. 7. Fig. 9 is a detached perspective view of the match deliverer or ejector. Fig. 10 is a detached perspective view of the triple-armed rock-shaft. Fig. 11 is a detached perspective view of the pawl adapted for engagement with the advertising-reel. Fig. 12 is an end view of the grooved match-support formed on the casing.

I am aware that an advertising device in connection with a cigar-clipper or a match-delivering device is not new and also that a cigar-clipper and match-delivering device actuated simultaneously during the action of clipping the end of a cigar has been provided for heretofore in devices of this kind; but in all such devices the inclosing casing thereof has been movable, or parts of the operating mechanism have been supported on the outside of the casing, thereby rendering the device objectionable and unsightly.

I provide for entirely inclosing the various operating parts within the casing, so as to render them invisible, and for projecting or delivering the matches one at a time through a small opening slightly larger in diameter than the diameter of a match.

Referring to the drawings in detail, similar numerals of reference refer to similar parts in the several figures.

The numeral 10 designates the casing in which the operating mechanism is confined and which is preferably rectangular and has surmounted thereon a casing 11, formed to represent a man. The casing 11 is provided with an opening 12, into which the tips of cigars are placed to be clipped. Said opening is in the head of the image and represents the latter as having its mouth open.

13 designates the match-safe, 14 the cigar-clipping mechanism, and 15 the reel-bearing advertisements and adapted to be revolved each time the clipping mechanism is actuated.

Extending lengthwise within the casing is an operating-lever 16, fulcrumed between its ends on a pivot-pin 17 and extending out through a vertical slot 18 in one of the end walls of the casing, the free outer end of said lever being provided with a handle for conveniently manipulating the same. Said lever has connection, by means of a link 19, with one arm of a three-armed rock-shaft 20, arranged transversely in the casing, the other two arms 21 of said shaft extending in an opposite direction and having connection with a match-lifter to be hereinafter described. One of the arms 21 is connected with the vertically-movable cigar-clipper bar 23 by a link 24, said bar extending up into the hollow image or casing 11 and being guided for movement in one or more guides 25. The upper end of said bar is cut obliquely and beveled to a knife-edge which acts against a shearing-plate 26, secured above the cigar-opening 12. A spring 27 surrounds the rock-shaft 20 and has one end engaging one of the arms 21 thereon and its other end held in a socket 28, formed in the casing, said spring serving to maintain the parts normally in the position shown in Fig. 2.

The match-safe comprises a match-receptacle 29, having a depending leg or tube 30, in which is movably held a match-lifter 31, having laterally-extending lugs or flanges 32, separated by an intervening space in which the rounded ends 33 of the arms 21 are held. The outer ends of said lugs or flanges are curved around the rounded ends of said arms, as shown in Fig. 2, and serve to prevent accidental withdrawal of the latter from the match-lifter. The match-receptacle is provided with a curved wall 34, which directs the matches toward the vertical wall 35, forming a continuation of one of the walls of the tube or leg 30, in which the match-lifter is guided for movement. A second leg or tube 36 is provided which is connected at its upper end with the upper end of the match-receptacle by a passage 37, having an inclined bottom 38. The upper end of the match-lifter is beveled toward the vertical wall 35, as at 39, and between the latter and the beveled face of the lifter a match is carried and delivered onto the inclined bottom 38, from which it rolls into the leg or tube 36. The sides of said tube are curved inward at their lower ends, as at 40, a space 41 being left between the two somewhat smaller than the diameter of the thinnest match to be used, the curved ends of the said side walls serving to hold the match in the bottom of the leg when deposited therein. The end walls are cut away at their lower ends to provide openings 42, which permit the passage into and from the tube 36 of a match ejector or deliverer 43.

The latter is guided for movement on a transverse guide-rod 44, secured in the side walls of the casing 10, and has a stop-sleeve 45 extending therefrom to limit the movement thereof in one direction. Said stop-sleeve strikes against the casing and effectually guards against straining of the parts by reason of overreaching their proper limit of movement, and in addition thereto it provides a bearing of considerable length and prevents binding of the match-ejector on the guide-rod, which is the tendency when a short bearing is provided. The ejector comprises the body portion 46 and a cylindrical ejecting portion 47, connected by a narrow web 48, adapted to travel in the space 41 between the incurved lower ends of the walls of the tube 36, the ejecting portion 47 being of a size to readily pass through the openings 42 in the end walls of said tube. A continuation 49 is formed on the ejecting portion in the form of a rod which is guided for movement in an opening 50, formed in the casing, thereby holding the ejector or deliverer in proper position with the ejector portion in line with the openings 42 in the tube 36. The ejector may, however, be otherwise held against turning on the guide-rod 44.

The inner end of the operating-lever 16 is connected, by means of a link 51, to one end of a lever 52, pivoted between its ends to a suitable bracket 53 and having its other end connected, by means of a link 54, to one arm of a bell-crank lever 55, which has its other arm connected, by means of a link 56, to the match ejector or deliverer. By this system of levers the necessary extent of movement of the match-ejector is obtained with but a slight movement of the inner end of the operating-lever, provision being also made thereby for giving the ejector the proper direction of movement on the down-and-up stroke of said lever.

In the casing 10 in line with the lower end of the tube 36 is an orifice 57, and projecting from the casing directly beneath said orifice is a ledge or support 58 for supporting a match. Said ledge is grooved to form a way for the match when being delivered, and above the same a tube 59 is secured, in which is held a spiral spring 60 and the shank of a bolt 61 within said spring. The upper end of the latter bears against the closed upper end of said tube, and the lower end thereof bears against the head 62 of said bolt, which bears against the ledge directly over the groove therein.

The reel 15 is adapted to bear advertisements, painted or removably secured to the peripheral surface thereof. Said reel is suitably journaled, herein shown as in the end wall of the casing 10 and in a bracket 64, secured to one of the side walls of the latter. Said reel is provided at one end with an annular series of ratchet-teeth 65 and with a ratchet-arm 66, loosely mounted on the shaft 67, supporting said reel. A link 68 connects said ratchet-arm with the operating-lever 16, and said arm is provided with outstanding lugs 69, between which is pivotally secured a pawl 70, having secured thereto a spring 71, bearing with its free end against said arm and serving to hold said pawl in constant engagement with the ratchet-teeth.

The advertising-reel may be covered with a curved plate 72, and when so curved I provide the plate with a sight-opening 73, through which the advertisements on the reel are exposed to view successively.

On depressing the operating-lever the advertising-reel is revolved to expose a new advertisement to view through the sight-opening by the action of the link 68, ratchet-arm 66, and pawl 70, and the cigar-clipper is actuated by the operating-lever, imparting its motion through the three-armed rock-shaft and the link 24. A match is delivered by the movement of the operating-lever being imparted to the match-ejector through the intervention of the link 51, lever 52, link 54, bell-crank lever 55, and link 56. The ejector on being actuated moves into the leg or tube 36 of the match-safe and engages the ends of the match therein, forcing the same from said tube and delivering it out through the orifice 57, so as to pass between the ledge 58 and the bolt 61, where it is held until withdrawn. On withdrawing the match from between the ledge and the spring-pressed bolt it is ignited. During the action of projecting or delivering the match the arms 21 of the rock-shaft cause the match-lifter 31 to take up a match and deposit the same into the tube 36, from which it is delivered on the next movement of the operating-lever.

Having thus described my invention, what I claim is—

1. The combination with the casing, of a cigar-clipping device, a match-safe comprising a receptacle and a leg or tube connected by a passage with said receptacle, a lifter adapted to elevate one match at a time and deposit the same in said leg, delivering mechanism adapted to eject the match from said tube, an operating-lever, operative connection between the latter and said delivering mechanism, a rock-shaft operatively connected with said operating-lever, and operative connections between the cigar-clipping device and said rock-shaft, and between the latter and said lifter.

2. The combination with the casing, of a cigar-clipping device, a match-safe comprising a receptacle and a leg or tube connected by a passage with said receptacle, a lifter adapted to elevate one match at a time and deposit the same in said leg, delivering mechanism adapted to eject the match from said tube, an operating-lever, operative connection between the latter and said delivering mechanism, a rock-shaft having oppositely-directed arms, a link connecting one of said arms with the operating-lever, and a link connecting the other of said arms with the clipping device, said last-mentioned arm having connection with the said lifter.

3. The combination with the casing, a match-safe, and a cigar-clipping device, of a longitudinal operating-lever, a transverse rock-shaft having opposite arms, a link connecting one of said arms with the operating-lever, a link connection between the other of said arms and the clipping device, a transversely-movable match-deliverer acting to deliver one match at a time from the match-safe, and operative connection between said deliverer and the operating-lever.

4. The combination with the casing, of a cigar-clipping device, an operating-lever pivoted between its ends, a rock-shaft having oppositely-directed radial arms, a link between the operating-lever and one of said arms, a spring surrounding said rock-shaft and having one end thereof connected to the other of said arms and its other end held to the casing, and a link connecting the last-mentioned arm with the said clipping device.

5. The combination with the casing, of a cigar-clipping device, a match-safe comprising a receptacle and a receiving-leg connected with the upper end of said receptacle, a lifter adapted to elevate one match at a time from said receptacle and deposit the same in said receiving-leg, an operating-lever, a rock-shaft, an arm extending from said rock-shaft, a link connecting said arm with the operating-lever, a pair of arms extending from said rock-shaft and having their outer ends connected to said lifter, a link connecting one of the pair of arms with the cigar-clipping device, and match-delivering mechanism operatively connected with the operating-lever and adapted to eject the matches from said receiving-leg.

6. The combination with a casing, of a match-safe comprising a receptacle having a depending tube and a receiving-leg connected with the upper end of said receptacle by a passage having an inclined bottom, a lifter in said tube having a pair of lugs at its lower end, match-delivering mechanism, an operating-lever connected with said delivering mechanism, a rock-shaft having a pair of arms arranged with their outer ends between the lugs on the lifter, and operative connection between said rock-shaft and the operating-lever.

7. The combination with a casing, of a match-safe, a match-delivering device, a longitudinally-disposed operating-lever, operative connection between said delivering device and said operating-lever comprising a transverse lever pivoted between its ends, a link connecting one end of said transverse lever with the operating-lever, a bell-crank lever, a link connecting the opposite end of said transverse lever with one end of the bell-crank lever, and a link connecting the delivering device with the other end of said bell-crank lever.

8. In a combined cigar-clipper and match-safe, the combination of a match-safe comprising a match-receptacle and a match-receiving tube, mechanism for delivering a single match into said receiving-tube, mechanism for ejecting the matches from said match-receiving tube, cigar-clipping mechanism, an operating-lever, a rock-shaft connected with said operating-lever, operative connection between said rock-shaft and said clipping mechanism, operative connection between said match-delivering mechanism and the rock-shaft, and operative connection between the match-ejecting mechanism and said operating-lever.

9. The combination with the casing, of a cigar-clipping device, a match-safe comprising a receptacle and a receiving-leg connected with the upper end of said receptacle, a lifter having two lateral flanges and adapted to elevate one match at a time from said receptacle and deposit the same in said receiving-leg, an operating-lever, a rock-shaft, an arm extending from said rock-shaft, a link connecting said arm with the operating-lever, a pair of arms extending from said rock-shaft and having their outer ends rounded and fitting between the flanges of said lifter, a link connecting one of the pair of arms with the cigar-clipping device, and match-delivering mechanism operatively connected with the operating-lever and adapted to eject the matches from said receiving-leg.

10. A match-safe comprising a match-receptacle and a match-receiving leg connected with the upper end of said receptacle, a lifter adapted to elevate one match at a time from said receptacle and deposit it in said receiving-leg, an operating-lever, a rock-shaft, an arm extending from said rock-shaft and connected to said lifter, a lever fulcrumed between its ends, a link connecting one end of said last-mentioned lever with the operating-lever, a bell-crank lever, a link connecting one arm of said bell-crank lever with the lever fulcrumed between its ends, delivering mechanism for ejecting the match deposited in said match-receiving leg, and a link connecting the other arm of said bell-crank lever with said delivering mechanism.

In testimony whereof I have affixed my signature in the presence of two subscribing witnesses.

ROBERT O. HAMMOND.

Witnesses:
  EMIL NEUHART,
  MAY F. SEWERT.